(12) United States Patent
Lee et al.

(10) Patent No.: US 12,075,469 B2
(45) Date of Patent: Aug. 27, 2024

(54) SCHEDULING REQUEST ENHANCEMENTS FOR 5G NETWORKS

(71) Applicant: Apple Inc., Cupertino, CA (US)

(72) Inventors: Anthony Lee, San Diego, CA (US); Seau S. Lim, Swindon (GB); Youn Hyoung Heo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 480 days.

(21) Appl. No.: 17/284,707

(22) PCT Filed: Oct. 29, 2019

(86) PCT No.: PCT/US2019/058551
§ 371 (c)(1),
(2) Date: Apr. 12, 2021

(87) PCT Pub. No.: WO2020/092359
PCT Pub. Date: May 7, 2020

(65) Prior Publication Data
US 2021/0352717 A1    Nov. 11, 2021

Related U.S. Application Data

(60) Provisional application No. 62/753,830, filed on Oct. 31, 2018.

(51) Int. Cl.
*H04W 74/0808*    (2024.01)
*H04W 16/14*    (2009.01)
(Continued)

(52) U.S. Cl.
CPC ....... *H04W 74/0808* (2013.01); *H04W 16/14* (2013.01); *H04W 72/1221* (2013.01); *H04W 72/21* (2023.01); *H04W 76/19* (2018.02)

(58) Field of Classification Search
CPC ............. H04W 74/0808; H04W 76/19; H04W 72/1284; H04W 72/1221; H04W 16/14
See application file for complete search history.

(56) References Cited

U.S. PATENT DOCUMENTS

2016/0057785 A1    2/2016  Zhang et al.
2016/0338097 A1    11/2016 Andreoli-Fang et al.
2021/0274555 A1*   9/2021  Alfarhan ........... H04W 74/0808

OTHER PUBLICATIONS

R2-1811459 InterDigital "SR in NR-U" 3GPP WG2 #103 Gothenburg Aug. 20-24, 2018 (Year: 2018).*

(Continued)

*Primary Examiner* — Basil Ma
(74) *Attorney, Agent, or Firm* — Kowert, Hood, Munyon, Rankin & Goetzel, P.C.

(57) ABSTRACT

An apparatus of user equipment (UE) includes processing circuitry coupled to memory, where to configure the UE for communication of data in a New Radio-Unlicensed (NR-U) spectrum, the processing circuitry is to decode RRC signaling from a base station. The RRC signaling includes configuration information to configure a listen-before-talk (LBT) timer and a scheduling request (SR) prohibit timer. An LBT procedure is performed while the LBT timer is activated. An SR is encoded for transmission to the base station, based on detecting an unoccupied transmission resource within the NR-U spectrum during the LBT procedure. The SR transmission activates the SR prohibit timer. An uplink grant from the base station is decoded in response to the SR, the uplink grant received while the SR prohibit timer is activated. A buffer status report (BSR) is encoded for transmission to the base station based on the uplink grant.

20 Claims, 5 Drawing Sheets

(51) Int. Cl.
*H04W 72/12* (2023.01)
*H04W 72/21* (2023.01)
*H04W 76/19* (2018.01)

(56) References Cited

OTHER PUBLICATIONS

R2-1813723 ZTE "consideration on SR enhancement for NR-U operation" 3GPP WG2 #103bis Chengdu Oct. 8-12, 2018 (Year: 2018).*
Interdigital, "SR in NR-U", 3GPP TSG-RAN WG2, Meeting #103bis, R2-1814009, Oct. 2018, Chengdu, China, 5 pgs.
OPPO, "SR Transmission and Procedure for NR-U", 3GPP TSG-RAN WG2, Meeting #103bis, R2-1813585, Oct. 2018, Chengdu, China, 3 pgs.
ZTE, "Impacts on MAC for NR-U Operation", 3GPP TSG-RAN WG2, NR #103 Meeting, R2-1811282, Aug. 2018, Gothenburg, Sweden, 3 pgs.
International Search Report and Written Opinion for International Application No. PCT/US2019/058551, mailed Feb. 14, 2020, 7 pgs.

* cited by examiner

SCHEDULING REQUEST ENHANCEMENTS FOR 5G NETWORKS

PRIORITY CLAIM

This application is a U.S. National Stage filing of International Application No. PCT/US2019/058551, filed Oct. 29, 2019, which claims the benefit of and priority to the U.S. Provisional Application No. 62/753,830, filed Oct. 31, 2018. All of the aforementioned applications are incorporated herein by reference in their entireties.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to systems and methods for scheduling request (SR) enhancements for 5G networks including NR-U networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATS) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LIE technology with the simplicity of Wi-Fi-like deployments.

Further enhanced operation of LTE systems in the licensed as well as unlicensed spectrum is expected in future releases and 5G systems. Such enhanced operations can include techniques for SR enhancements for 5G networks including NR-U networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
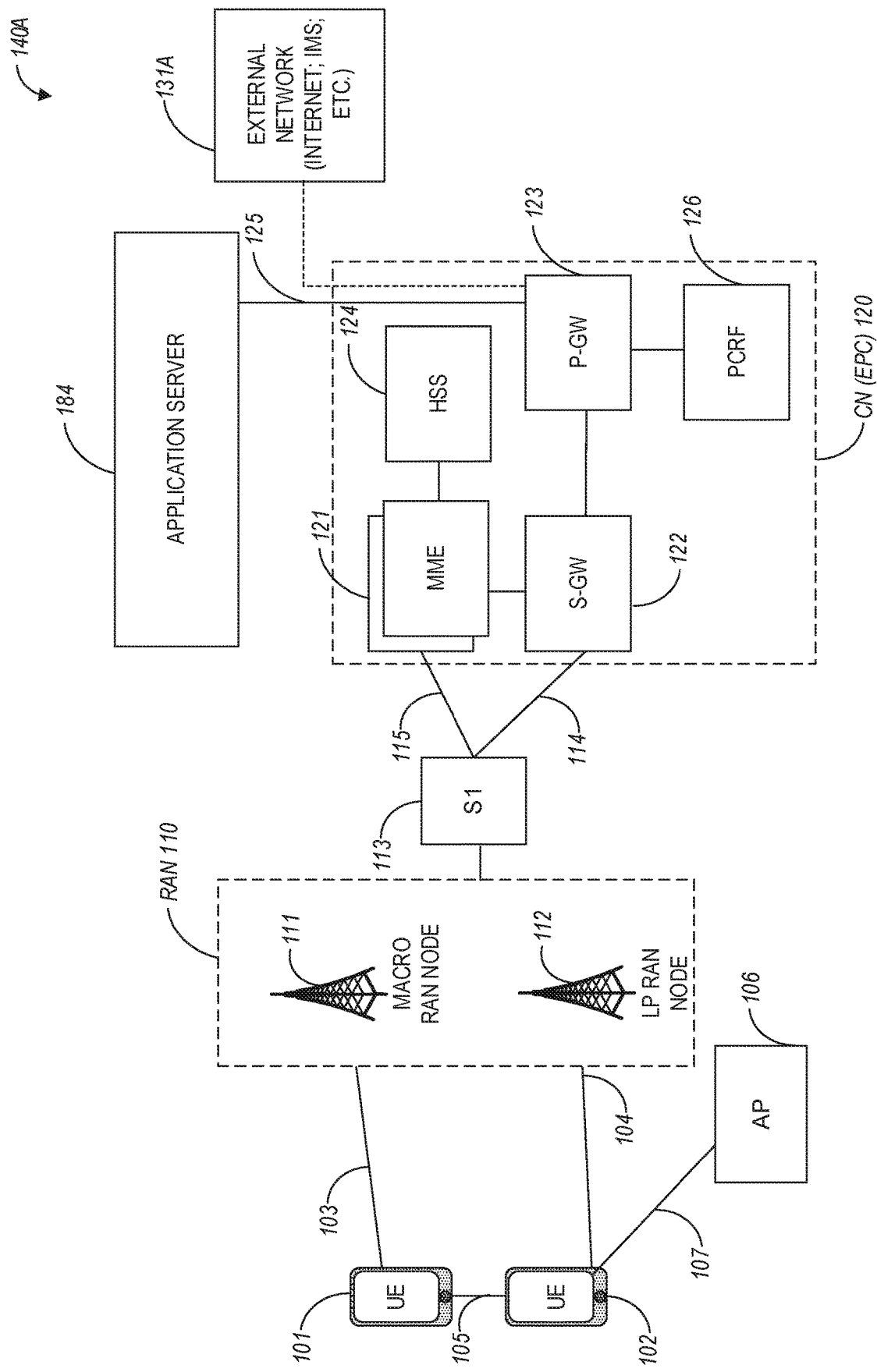
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single LT, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UNITS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MMF) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (ANTE) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
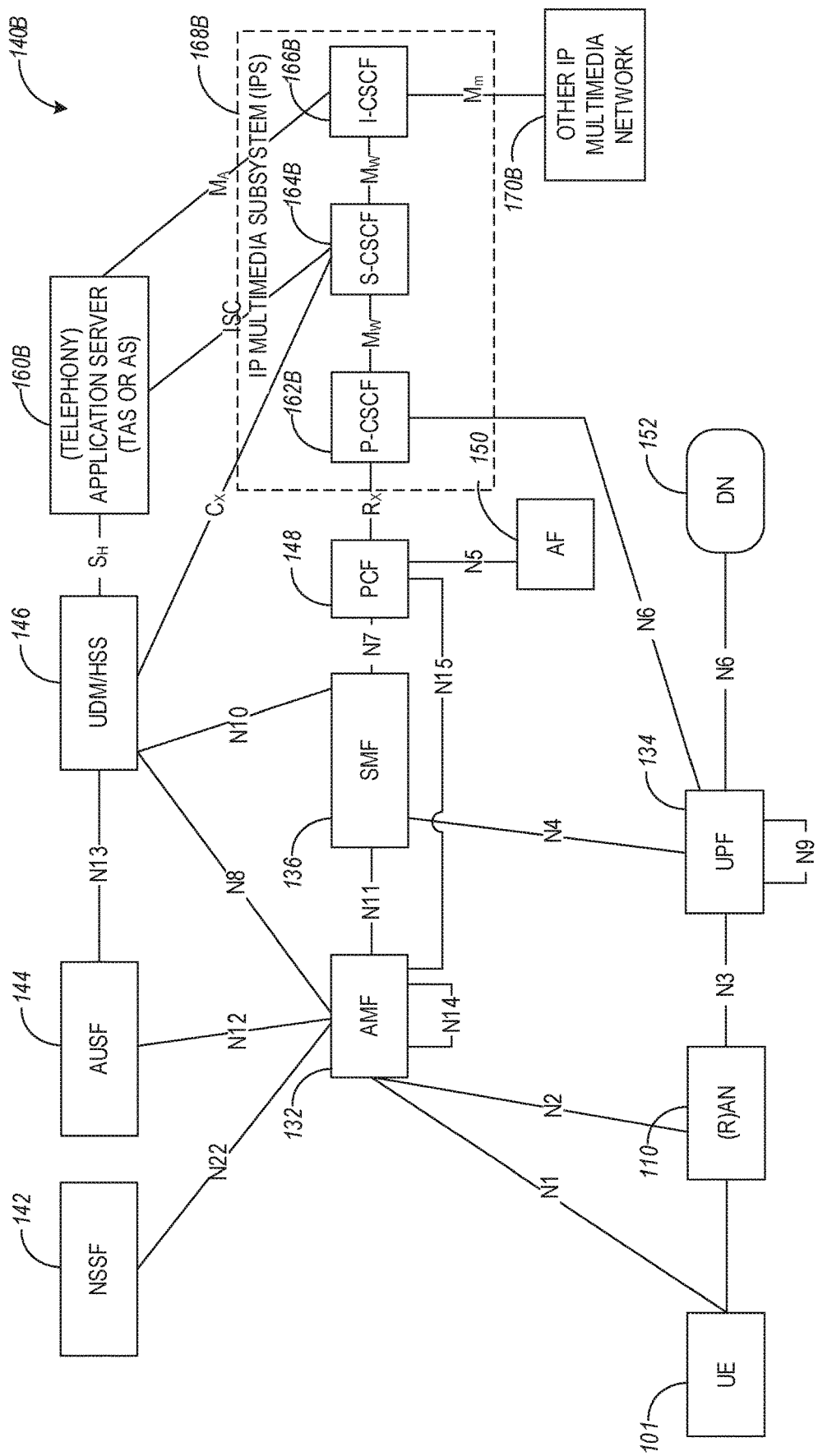
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (ANTE) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. B), or interrogating CSCF (I-CSCF) 166B, The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operators network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 19 illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
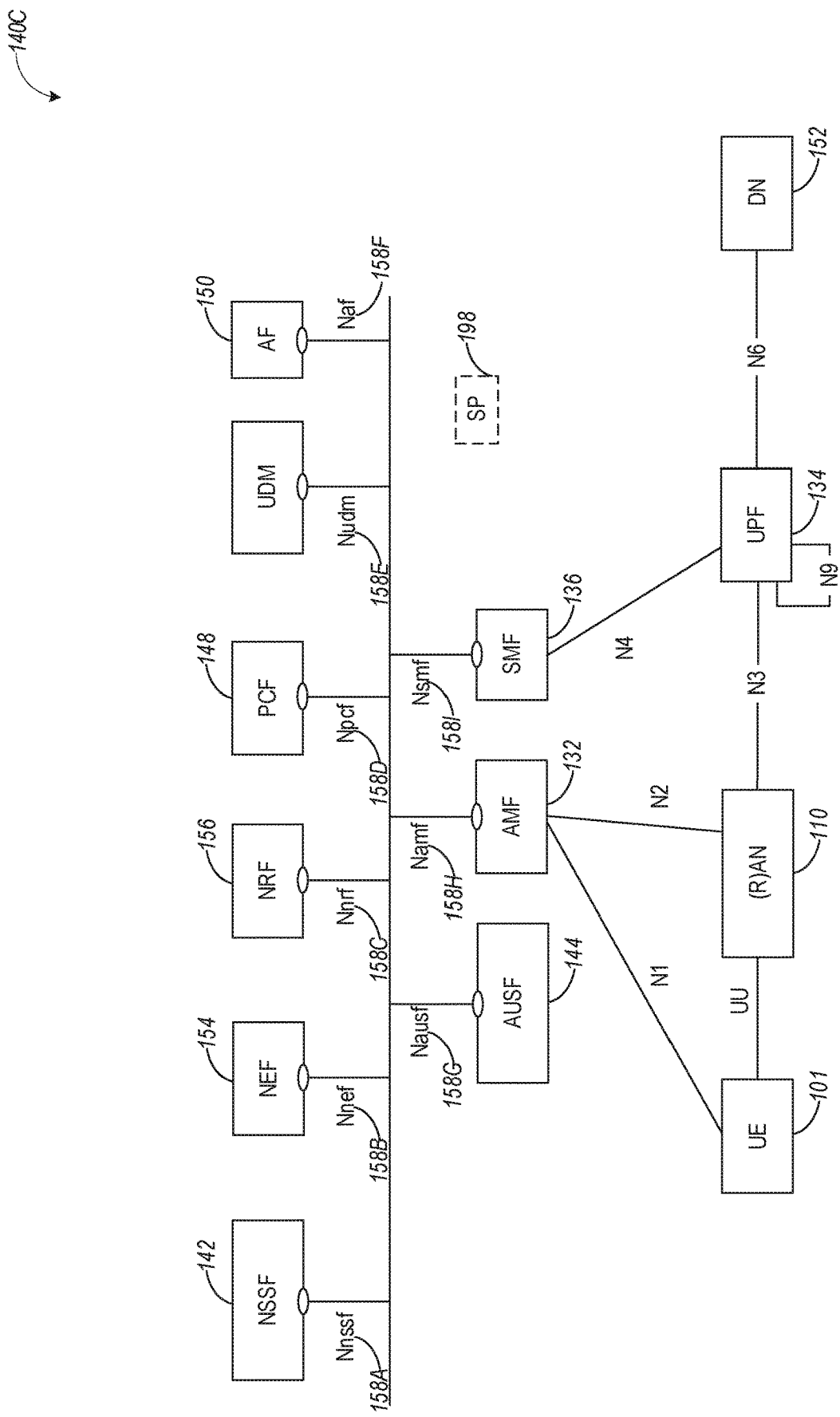

FIG. 1C illustrates a 5G system architecture 140C and a service-based representation. In addition to the network entities illustrated in FIG. system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

Rel-15 NR systems are designed to operate on the licensed spectrum. The NR-U is a technology that enables the operation of NR systems on the unlicensed spectrum.

A scheduling request (SR) is needed for UEs in connected mode or in NR-U standalone mode, as well as in an LTE-NR-U deployment scenario. Transmitting an SR on a PUCCH may be subject to certain listen-before-talk (LBT) requirements in the unlicensed spectrum. Techniques discussed herein can be used to alleviate the impacts of LBT.

SR Counter and Timer.

In some aspects, RRC signaling can be used to configure an SR timer, an SR counter, and a threshold (e.g., sr-TransMax threshold) for the SR counter. Additionally, the RRC signaling can also configure a separate LBT timer (or LBT success timer) as well as in the LBT failure counter (and an associated LBT failure counter threshold). The LBT timer can be started after an LBT procedure is initiated. If the UE does not detect an available spectrum/channel before the LBT timer expires, the LBT failure counter is incremented. If the LBT failure counter threshold is reached, a connection reestablishment or another reconfiguration procedure can be initiated. Otherwise, a new LBT timer can be started after a new LBT procedure is initiated.

Upon successful detection of the available NR-U spectrum, the SR timer can be started upon the communication of an SR to the base station. If a response (e.g., a first uplink grant) is not received before the SR timer expires, the SR counter is incremented. If the SR counter threshold is reached, the UE can perform a connection reestablishment or another reconfiguration procedure. If the UE receives the first uplink grant before the SR timer expires, the UE can communicate a buffer status report (BSR) to the base station, and receive a second uplink grant in response to the BSR. The UE can then communicate the data reflected in the BSR to the base station using the second uplink grant.

In some aspects, when a separate LBT timer and a separate LBT counter are not configured, the UE can increase the timer duration for the SR timer as well as the SR counter threshold to account for a possible SR transmission delay due to LBT failures.

In some aspects, SR transmissions are subject to LBT (e.g., in NR-U communication networks). In this case, starting an SR timer (e.g., the sr-ProhibitTimer) may prevent the MAC entity of the UE from signaling the physical layer for an SR transmission if the SR transmission is not performed due to LBT during the SR transmission occasion configured for the pending SR. Hence, in some aspects, the physical layer may indicate the success of the LBT during the SR transmission occasion to initiate the start of the prohibit timer.

In aspects when a previous SR transmission is not successful due to LBT (i.e., absence of physical layer indication on the previous SR transmission occasion), the UE can determine whether to increment SR_COUNTER for the subsequent SR transmission occasion for the SR that is configured.

The purpose of the SR counter (e.g., SR_COUNTER) is to give a maximum attempts the UE can perform SR transmission to avoid the UE getting stuck in the requesting state due to poor RF conditions. LBT failure can be seen as another factor of poor RF condition (i.e., when the channel load is very high). In this regard, the SR_COUNTER may be incremented. To take into consideration of the LBT failure, the sr-TransMax counter threshold can be configured appropriately to provide the time domain solution to overcome LBT via RRC signaling/default configuration or set dynamically based on channel load (e.g. RSSI or channel occupancy, presence of DL transmission, etc.). For RSSI or channel occupancy, if such values are above a certain fixed or configurable threshold at the point the SR procedure started, the sr-TransMax threshold may be used for that RSSI or channel occupancy. In this regard, there is an sr-TransMax for different RSSIs or channel occupancy.

In aspects when the counter is not incremented, the MAC entity may get stuck in this state for a very long time if the channel continues to be busy during the SR transmission occasion. This processing may be acceptable when the channel is lightly loaded.

In some aspects, a separate LBT success timer and an LBT counter (per SR configuration) may be used to count the number of SR transmission failures due to LBT. In this case, the existing SR_COUNTER may continue to be associated with failure of SR transmission due to RF condition other than LBT failure, while the new separate LBT failure counter counts the number of LBT failures associated with the SR transmission. Once the separate LBT failure counter reaches a fix or configurable maximum value, it can either report it to the network via RRC or MAC signaling message (for the DC or CA case) or perform RRC Connection Re-establishment.

Figure 2:
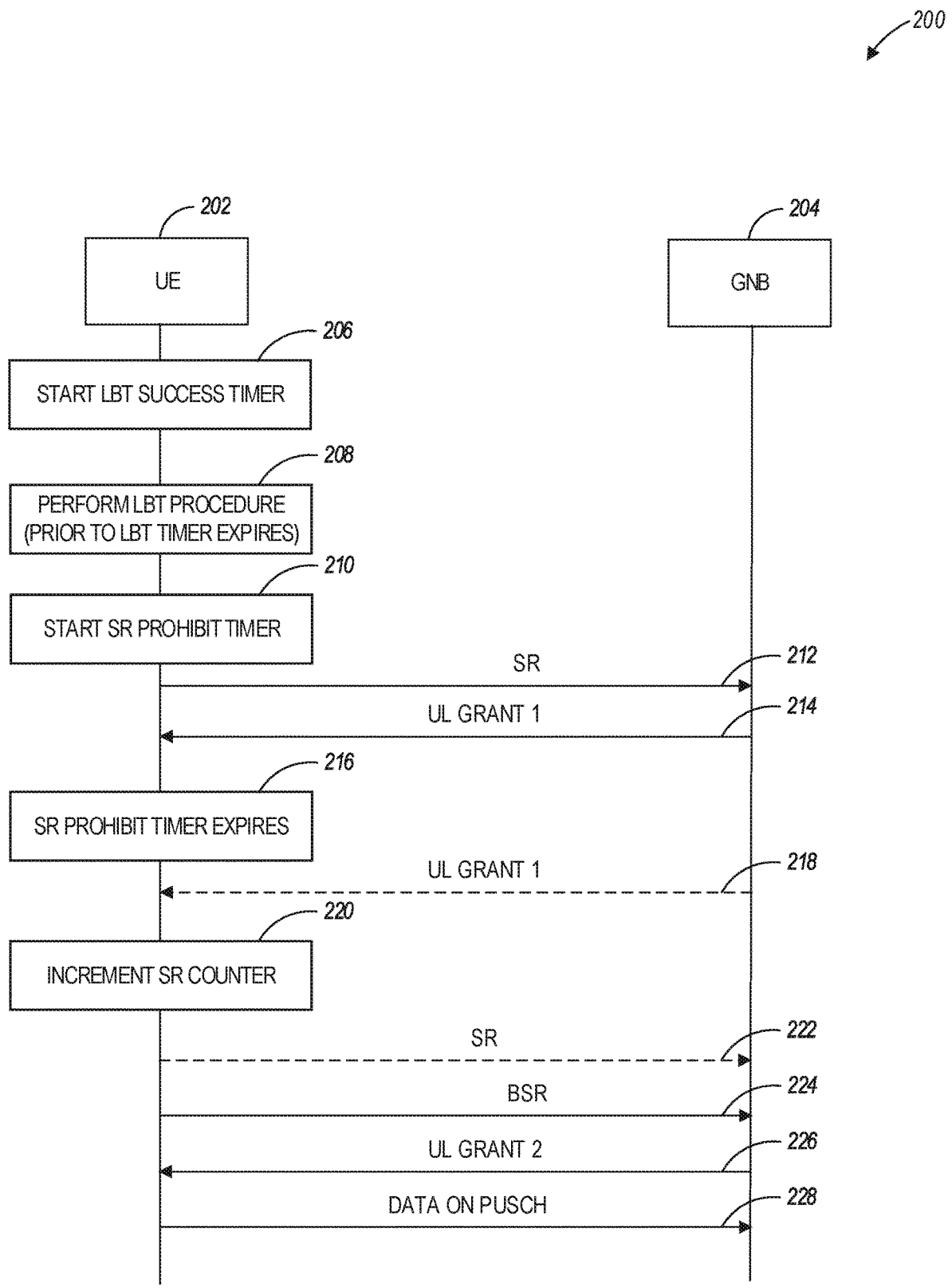
FIG. 2 illustrates a swimlane diagram of a communication exchange between user equipment and a base station using scheduling request enhancement techniques, in accordance with some aspects.

FIG. 2 illustrates a swimlane diagram of a communication exchange 200 between a user equipment (UE) 202 and a base station 204 using scheduling request enhancement techniques, in accordance with some aspects. Referring to FIG. 2, and an initial configuration stage, UE 202 may start the LBT success timer at operation 206. While the tinier is running, at operation 208, UE 202 may perform an LBT procedure and may detect an available NR-U spectrum prior to the expiration of the LBT success timer. Upon detecting the available spectrum, UE 202 may start the SR prohibit timer at operation 210. While the SR prohibit timer is running, the UE 202 communicates an SR to the base station 204 at operation 212. In response, at operation 214, the base station 204 communicates a first uplink grant for communication of a BSR. At operation 216, the SR prohibit timer expires.

Optionally, the first uplink grant may be received via operation 218, subsequent to the expiration of the SR prohibit timer, and retransmits the SR at operation 222.

The UE 202 communicates the BSR at operation 224, based on the first uplink grant received from the base station 204. At operation 226, in response to the BSR, the base station 204 communicates a second uplink grant. At operation 228, the UE 202 communicates data on a PUSCH based on the second uplink grant.

Increasing SR Transmission Opportunity.

In some aspects, an SR configuration may include a set of PUCCH resources for SR across different bandwidth parts (BWPs) and/or cells. The PUCCH resources associated with an SR configuration can be overlapping in time across different BWP and serving cells.

In some aspects, to increase the SR transmission opportunities, the MAC may pass on multiple SR PUCCH resources across the different serving cell associated with the SR configuration to the physical layer, thus allowing the physical layer to attempt SR transmission on the first PUCCH resource (across different serving cell) that passes LBT. If multiple active BWPs is possible for NR-U communications, the PUCCH resources across different active BWP can also be used to increase the SR transmission opportunities. Therefore, the UE MAC entity may provide the PUCCH resources across different serving cells of the SR configuration to the physical layer. If multiple active BWPs is possible for NR-U communications, it may also be beneficial for the UE MAC entity to provide the PUCCH resources across different active BWPs of the SR configuration to the physical layer.

Scheduling Request and Configured Grant.

In some aspects, a configured grant may be configured and active for the UE, and the BSR may be communicated via the configured grant, without communicating an SR first. In this case, there is a need to ensure the BSR that is triggered only by logical channels that are configured to use unlicensed serving cell with Configured Grant enhanced for unlicensed carrier will not trigger an SR (this is to reduce the possible collision between configured grant and scheduled grant from happening). If all the logical channels that triggered the BSR has logical channel restriction restricting to use unlicensed serving cell with Configured Grant enhanced for unlicensed carrier, then SR may not be triggered.

In some aspects, techniques disclosed herein can be used to manage counters and timers in scheduling request when the transmission is subjected to LBT. In some aspects, scheduling request transmission opportunities can be increased in light of LBT. In some aspects, scheduling requests may be bypassed when a configured grant is available. The start of the sr-ProhibitTimer may be subject to the successfully completed indication of LBT. The counter SR_COUNTER may be increment regardless of the outcome of LBT. In some aspects, the SR_COUNTER threshold is configurable based on network loading or RF condition. In some aspects, a separate counter is used to count the number of LBT failures. In some aspects, a separate LBT counter is configurable via signaling from the base station. In some aspects, when the LBT counter reaches a configurable threshold, the counter value is reported to the gNB. In some aspects, when the LBT counter reaches a configurable threshold, the UE will go through RRC Connection Reestablishment. In some aspects, the counter SR_COUNTER is incremented when LBT passes. In some aspects, multiple PUCCH resources can be configured for each SR. In some aspects, the PUCCH resources can be located in a different frequency domain. In some aspects, the different frequency domains can include different BWPs, subbands, or serving cells. In some aspects, the scheduling request can be skipped if the logical channel configuration allows it. In some aspects, a configuration field (e.g., in control signaling) for indicating a skipped SR may be used.

Figure 3:
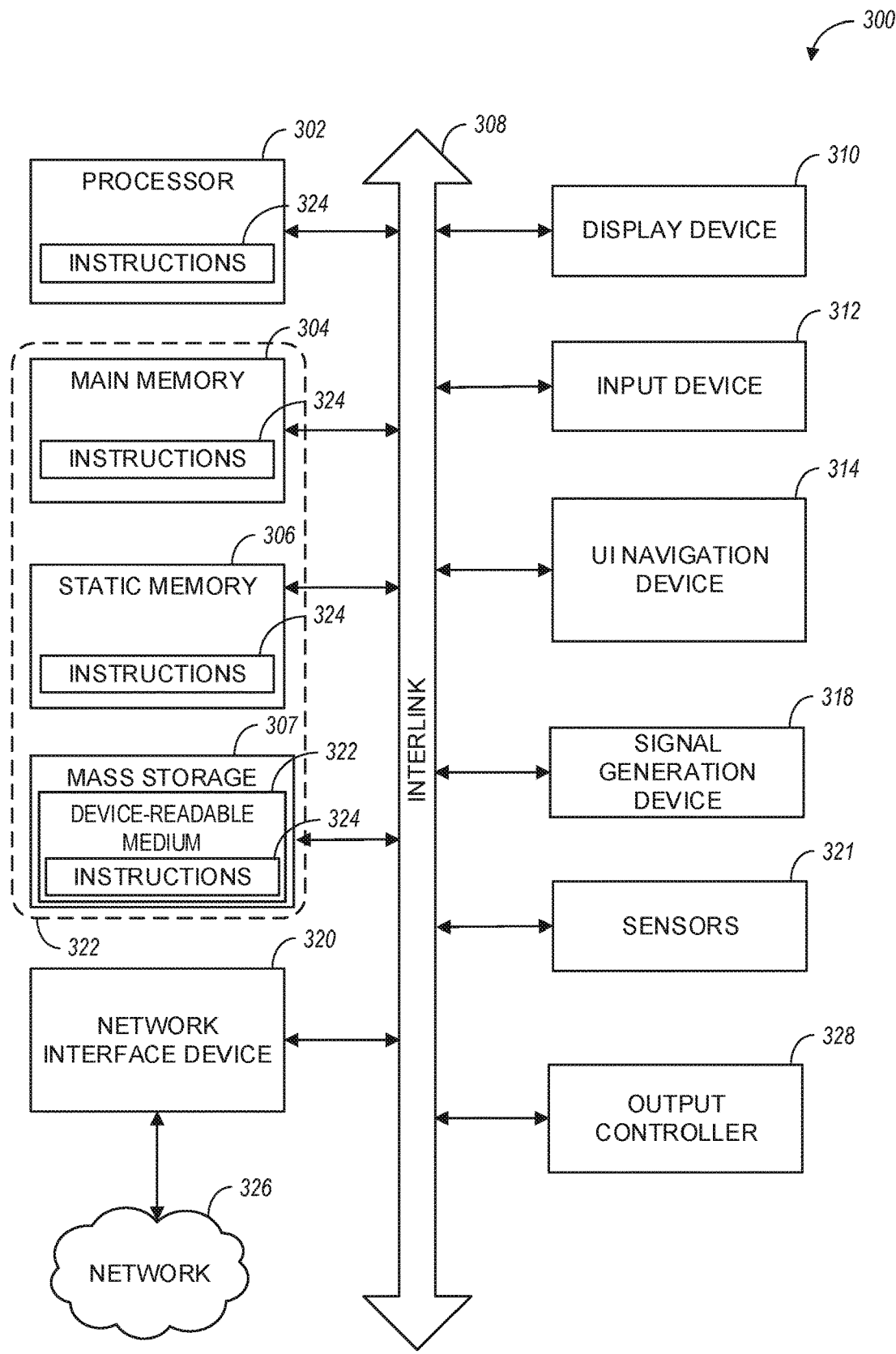
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved. Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a standalone device or may be connected (e.g., networked) to other devices. In a networked deployment, the communication device 300 may operate in the capacity of a server communication device, a client communication device, or both in server-client network environments. In an example, the communication device 300 may act as a peer communication device in peer-to-peer (P2P) (or other distributed) network environment. The communication device 300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312 and UI navigation device 314 may be a touchscreen display. The communication device 300 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database; and/or associated caches and servers) configured to store the one or more instructions 324. The term "communication device-readable medium" is inclusive of the terms "machine-readable medium" or "computer-readable medium", and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing any one of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the fill range of equivalents to which such claims are entitled.

What is claimed is:

1. An apparatus comprising:
at least one processor, wherein to configure a user equipment (UE) for communication of data in a New Radio-Unlicensed (NR-U) spectrum, the at least one processor is configured to cause the UE to:
instruct a physical layer to signal a scheduling request (SR) for transmission to a base station;
based on the SR transmission being unsuccessful due to a listen-before-talk (LBT) failure, increment an LBT failure counter without incrementing a SR counter and starting an SR prohibit timer; and
based on the LBT failure counter reaching a configured maximum value, report the LBT failure counter reaching the configured maximum value to the base station using medium access control (MAC) signaling.

2. The apparatus of claim 1, wherein determination of the LBT failure is based on a physical layer indication.

3. The apparatus of claim 1, wherein said instructing and incrementing is performed by a medium access control (MAC) layer.

4. The apparatus of claim 1, wherein the at least one processor is further configured to:
perform RRC connection re-establishment when the LBT failure counter reaches the configured maximum value.

5. The apparatus of claim 1, wherein said instructing is response to triggering of an SR, and wherein the SR is triggering by a buffer status report (BSR).

6. The apparatus of claim 1, wherein resources for the SR transmission are provided by an SR configuration, and wherein the SR configuration includes SR resources on corresponding physical uplink control channel (PUCCH) resources in a plurality of bandwidth parts.

7. The apparatus of claim 1, wherein the at least one processor is further configured to:
increment the SR counter and start the SR prohibit timer when the LBT is successful and the SR transmission fails.

8. A user equipment (UE) comprising:
wireless communication circuitry; and
at least one processor coupled to the wireless communication circuitry, wherein to configure a user equipment (UE) for communication of data in a New Radio-Unlicensed (NR-U) spectrum, the at least one processor is configured to cause the UE to:
instruct a physical layer to signal a scheduling request (SR) for transmission to a base station;
based on the SR transmission being unsuccessful due to a listen-before-talk (LBT) failure, increment an LBT failure counter without incrementing a SR counter and starting an SR prohibit timer; and
based on the LBT failure counter reaching a configured maximum value, report the LBT failure counter reaching the configured maximum value to the base station using medium access control (MAC) signaling.

9. The UE of claim 8, wherein determination of the LBT failure is based on a physical layer indication.

10. The UE of claim 8, wherein said instructing and incrementing is performed by a medium access control (MAC) layer.

11. The UE of claim 8, wherein the at least one processor is further configured to:
perform RRC connection re-establishment when the LBT failure counter reaches the configured maximum value.

12. The UE of claim 8, wherein said instructing is response to triggering of an SR, and wherein the SR is triggering by a buffer status report (BSR).

13. The UE of claim 8, wherein resources for the SR transmission are provided by an SR configuration, and wherein the SR configuration includes SR resources on corresponding physical uplink control channel (PUCCH) resources in a plurality of bandwidth parts.

14. The UE of claim 8, wherein the at least one processor is further configured to:
increment the SR counter and start the SR prohibit timer when the LBT is successful and the SR transmission fails.

15. A method for operating a base station, comprising:
by the base station:
communicating with a user equipment (UE) in a New Radio-Unlicensed (NR-U) spectrum, wherein the UE is configured to attempt to transmit a scheduling request (SR) to the base station, including using a listen-before-talk (LBT) procedure prior to transmitting the SR;
receive an indication from the UE that an LBT failure counter reached a configured maximum value using medium access control (MAC) signaling; and
based on the LBT failure counter reaching the configured maximum value, performing a procedure with the UE.

16. The method of claim 15, wherein the procedure with the UE is a connection reestablishment procedure.

17. The method of claim 15, further comprising:
transmitting radio resource control (RRC) signaling to the UE configuring the LBT failure counter maximum value.

18. The method of claim 17, wherein the RRC signaling further configures an LBT timer.

19. The method of claim 15, further comprising:
transmitting radio resource control (RRC) signaling to the UE configuring an SR timer and an SR counter.

20. The method of claim 15, further comprising:
transmitting an SR configuration to the UE, wherein the SR configuration includes SR resources on corresponding physical uplink control channel (PUCCH) resources in a plurality of bandwidth parts.

* * * * *